United States Patent
Bovee et al.

(10) Patent No.: US 7,415,310 B2
(45) Date of Patent: Aug. 19, 2008

(54) SYSTEM FOR HOME AUTOMATION

(75) Inventors: Jeffrey K. Bovee, Twin Lakes, WI (US);
Gregory J. Aper, Chicago, IL (US);
Brendan Doorhy, Westmont, IL (US);
Brian Gaza, Naperville, IL (US); Steven R. Reckamp, Hoffman Estates, IL (US);
Mihail C. Dinescu, Rosemont, IL (US);
Joseph Mazza, Elgin, IL (US); Michael Pelland, Medinah, IL (US); Tim Duitsman, Naperville, IL (US)

(73) Assignee: Intermatic Incorporated, Spring Grove, IL (US)

( * ) Notice: Subject to any disclaimer, the term of this patent is extended or adjusted under 35 U.S.C. 154(b) by 0 days.

(21) Appl. No.: 11/227,988

(22) Filed: Sep. 15, 2005

(65) Prior Publication Data
US 2007/0061020 A1 Mar. 15, 2007

(51) Int. Cl.
*G05B 19/18* (2006.01)
(52) U.S. Cl. .......................................................... 700/9
(58) Field of Classification Search .................... 700/3, 700/9, 8, 2, 21, 169, 19, 11, 20
See application file for complete search history.

(56) References Cited

U.S. PATENT DOCUMENTS

| | | | | |
|---|---|---|---|---|
| 5,086,385 A | * | 2/1992 | Launey et al. ................. 700/83 |
| 5,128,855 A | * | 7/1992 | Hilber et al. .................... 700/3 |
| 5,187,655 A | * | 2/1993 | Post et al. ....................... 700/17 |
| 5,677,603 A | * | 10/1997 | Speirs et al. ................. 315/324 |
| 5,761,083 A | * | 6/1998 | Brown et al. ................. 700/296 |
| 5,801,940 A | * | 9/1998 | Russ et al. ....................... 700/9 |
| 5,815,086 A | * | 9/1998 | Ivie et al. ............... 340/825.52 |
| 5,924,486 A | * | 7/1999 | Ehlers et al. ................. 165/238 |
| 6,192,282 B1 | * | 2/2001 | Smith et al. .................... 700/19 |
| 6,466,234 B1 | * | 10/2002 | Pyle et al. ..................... 715/771 |
| 6,803,728 B2 | | 10/2004 | Balasubramaniam et al. |
| 6,823,223 B2 | * | 11/2004 | Gonzales et al. .............. 700/86 |
| 6,834,208 B2 | * | 12/2004 | Gonzales et al. .............. 700/86 |
| 6,865,428 B2 | * | 3/2005 | Gonzales et al. .............. 700/86 |
| 6,970,751 B2 | * | 11/2005 | Gonzales et al. .............. 700/87 |
| 7,099,723 B2 | * | 8/2006 | Gonzales et al. .............. 700/87 |
| 2004/0158333 A1 | * | 8/2004 | Ha et al. ......................... 700/3 |

* cited by examiner

*Primary Examiner*—Thomas K Pham
(74) *Attorney, Agent, or Firm*—Brinks Hofer Gilson & Lione

(57) ABSTRACT

A home automation protocol system provides a network consisting of a number of node devices, controllers, and servers for storing information about node device settings and scene settings in a home environment is provided. The node devices are controlled by the controllers, in that the node devices are set to create scenes, which are stored in a scene server, while the operational states of the node devices are stored in a status server. The status server and scene server may be provided as separate units. The home automation protocol network is controlled by sending commands to the devices and servers, and new devices and controllers are added or updated, and new scenes are programmed. The network protocol allows devices running different protocols to be incorporated into the network.

18 Claims, 10 Drawing Sheets

SYSTEM FOR HOME AUTOMATION

BACKGROUND

The invention generally relates to a home automation system, and more specifically to a system for operating, maintaining, and configuring a home automation network using a home automation protocol.

With the proliferation of electrical and electronic appliances in the home, modern appliances may contain significant programmable and network-ready circuitry and interfaces. These appliances may be connected to a home network for use in setting home environment scenes. These scenes may include scenes such as varieties of lighting, temperature, or sound.

Protocols are used for interfacing home environment appliances with a network. Several commercially available network systems use proprietary protocols to interface devices with user interfaces to control the devices. Such interfaces and networks typically work with a single protocol and exclude devices that do not operate with the same proprietary protocol. Also, such networks may not be convenient for adding devices, controlling and changing scenes adaptively, or interacting with the network in a user-friendly manner.

BRIEF SUMMARY

A home automation system is presented for controlling home environment appliances. The system includes a network to connect a number of controllers, slave devices with associated appliances, servers for maintaining databases of home automation network protocols. Controllers are in communication with the network and may include an indicator. Slave devices may take on a number of operational states associated with scene information during operation. The servers may be scene servers, which contain information about all the scene settings in the network, or status servers, which contain information about all the operational states of devices in the network. The scene server and status server may be separate units provided in the system, and are in communication with each other. The network is adapted to route signals and commands between and to the slave devices, controllers, and servers in the network.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

DETAILED DESCRIPTION

Figure 1:
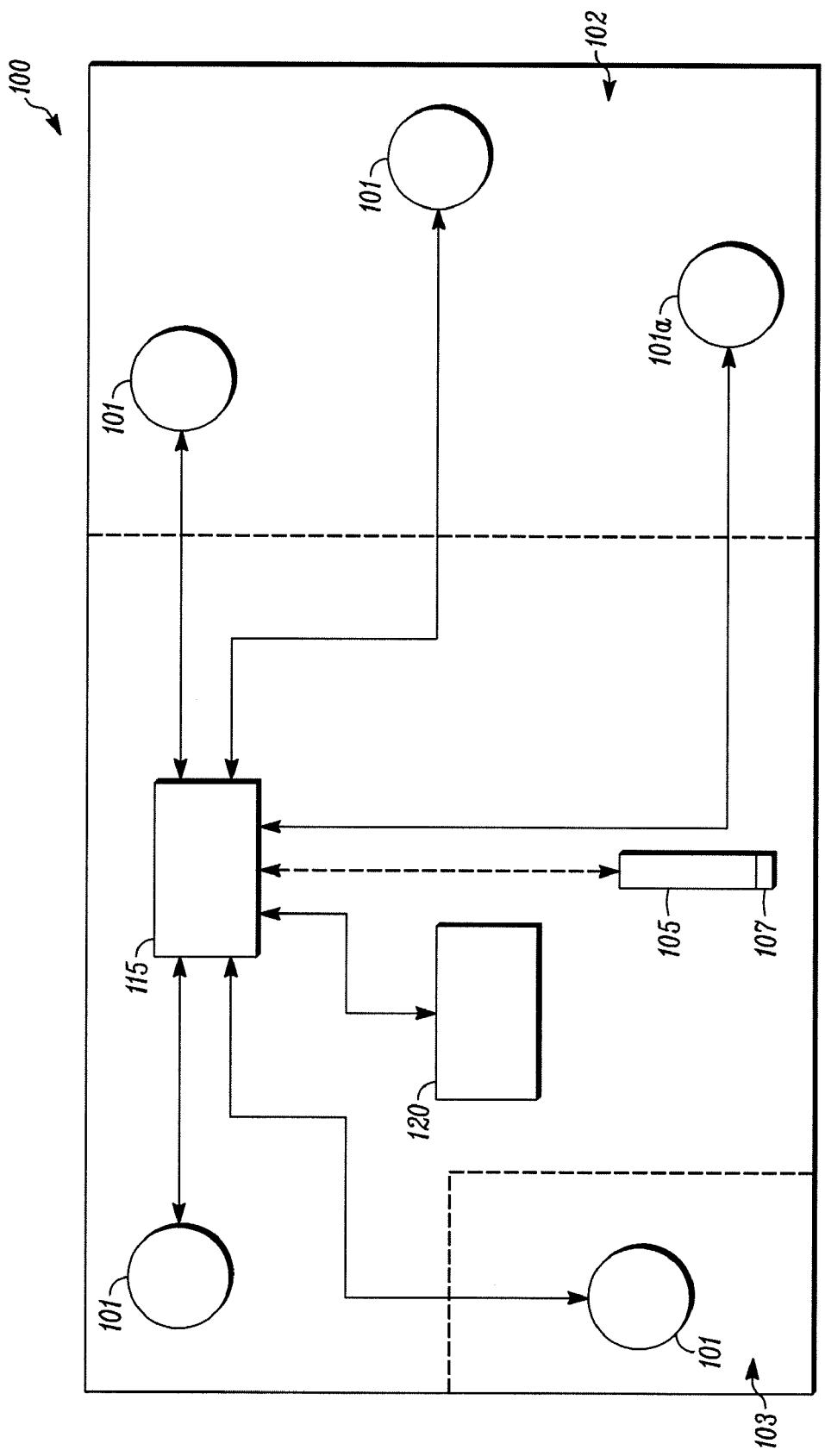
FIG. 1 illustrates a schematic view of a home with devices connected to a home automation network.

FIG. 1 illustrates a home environment 100 which may include a number of electrical and electronic appliances, such as lights, controlled by a network of node devices or slave devices 101 and controllers 105. The home environment 100 may include a one or more distinct rooms 102, 103, though these rooms 102, 103 may be joined or portioned as desired. The controllers 105 may activate the slave devices 101 by communicating across the network from room to room. Slave devices 101 and controllers 105 may be powered by battery devices such as standard alkaline battery cells, rechargeable battery cells like NiCd or Li-ion cells, or powered by connection to wall outlets.

The network is configured to route commands and signals between different controllers 105 and slave devices 101 in the network. Communication includes wireless, such as radio frequency (RF), microwave, infrared, or other wireless communication, and/or wired communications. The controllers 105 are devices that may be in communication with the network, and may be activated and manipulated by buttons present on the controller 105. A user can press the buttons on the controllers 105 to send commands to the slave devices 101 in the network to change a state of a component of the slave device 101, such as a relay or triac. The controller 105 may also be activated in other ways, such as by voice. Since the slave device 101 may supply power to the electrical or electronic appliance, a change in state of the component of the slave device 101 may in turn change the state of the electrical or electronic appliances.

Figure 2A:
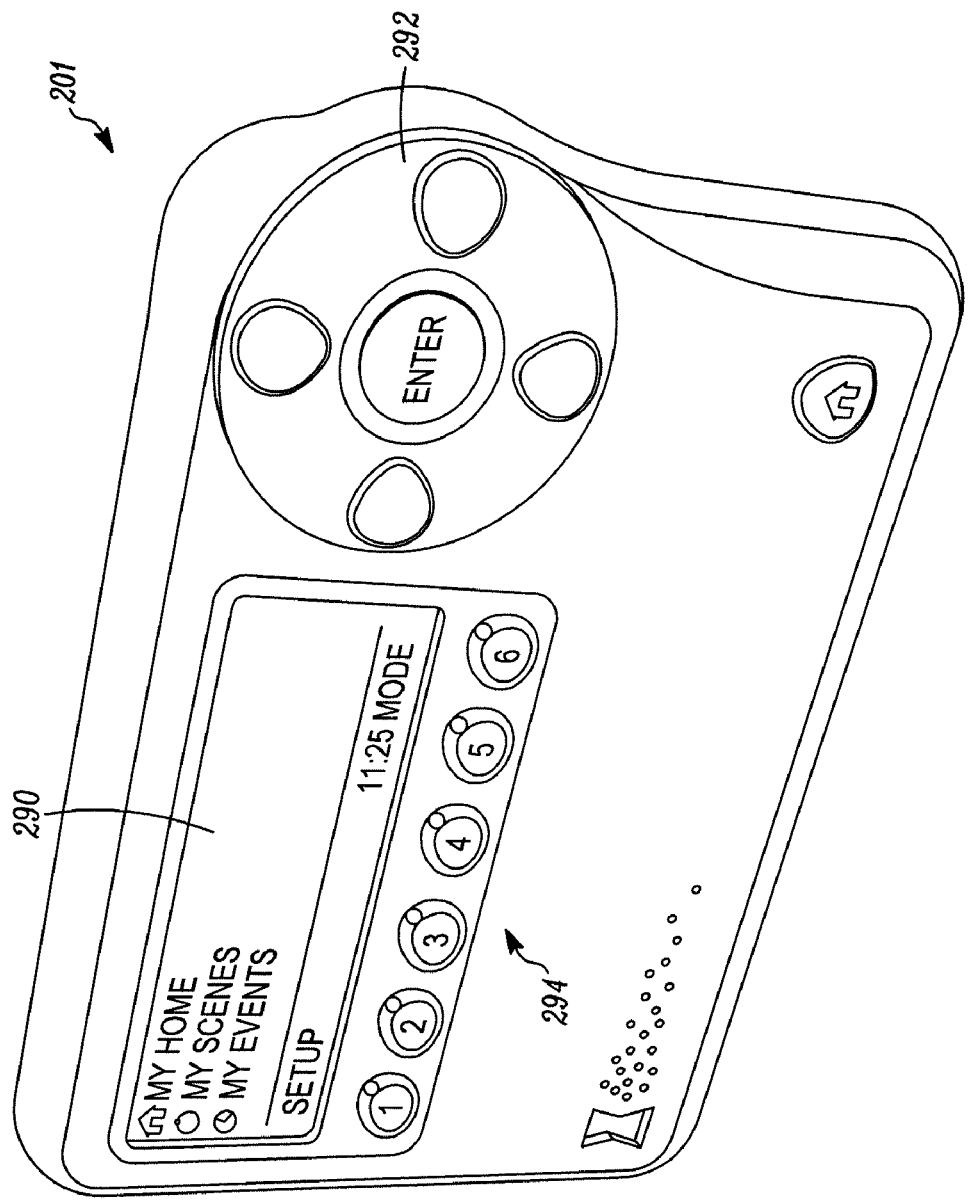
FIG. 2A illustrates a controller example.

FIG. 2A illustrates an example of a controller 105, such as control module 201. The control module 201 may include a display 290, such as liquid crystal display (LCD) screen, and input device 292. The input device 292 may include up, down, left, right and/or enter buttons, or other inputting devices, such as a keypad or a microphone for receiving voice-activated commands. A control menu with options may be shown to the user on the display 290. Using the input device 292, the user is able to navigate through each of the options to add, edit, or delete entries. The user may be presented with a 'My Home' option which allows the user to add rooms and edit rooms in the network. The rooms include living rooms, dining rooms, halls, garages, bathrooms, bedrooms, dens and/or kitchens. Another option may include a 'My Scene' option that allows a user to add, edit and turn on and off scenes. A scene may be a group of loads, such as lights or appliances, that turn on/off and/or dim up and down when a user pushes a button, or automatically when an event occurs. The scenes may be programmed to one or more of channel buttons 294. For example, activating scene one control all the lights and a television in a living room turn on. Scene two may have all the lights in the living room dim down, the television turn off and a stereo system turn on.

Another option displayed to the user may include a 'My Event' option. The user can add or edit events by entering a name of the event, and configure the events by selecting with the input device 292 scenes that will be activated or deactivated when the event occurs. For example, an event may be one that causes all lights and appliances in the kitchen turn off at 10:00 pm, and outside flood lights are turn on. Also included may be a 'Set Up' option for entering settings such as month, day, year, and time, and other settings such as a longitude and/or latitude of the user. Also included may be a 'Main' option, to send the user back to the main menu when selected. The main menu may display the user options and other indicators such as the current time.

Figure 2B:
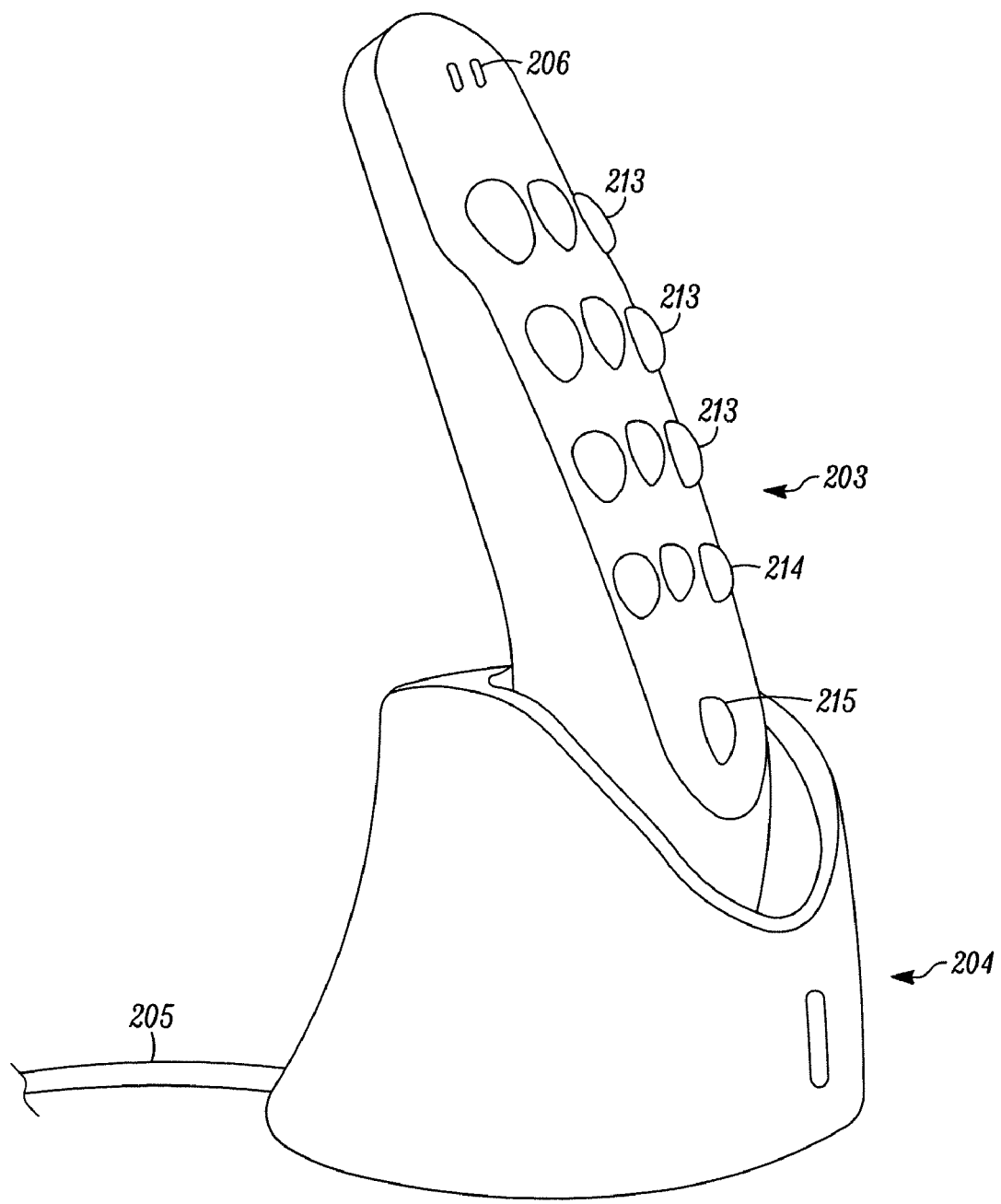
FIG. 2B illustrates another controller and a base.
Figure 2C:
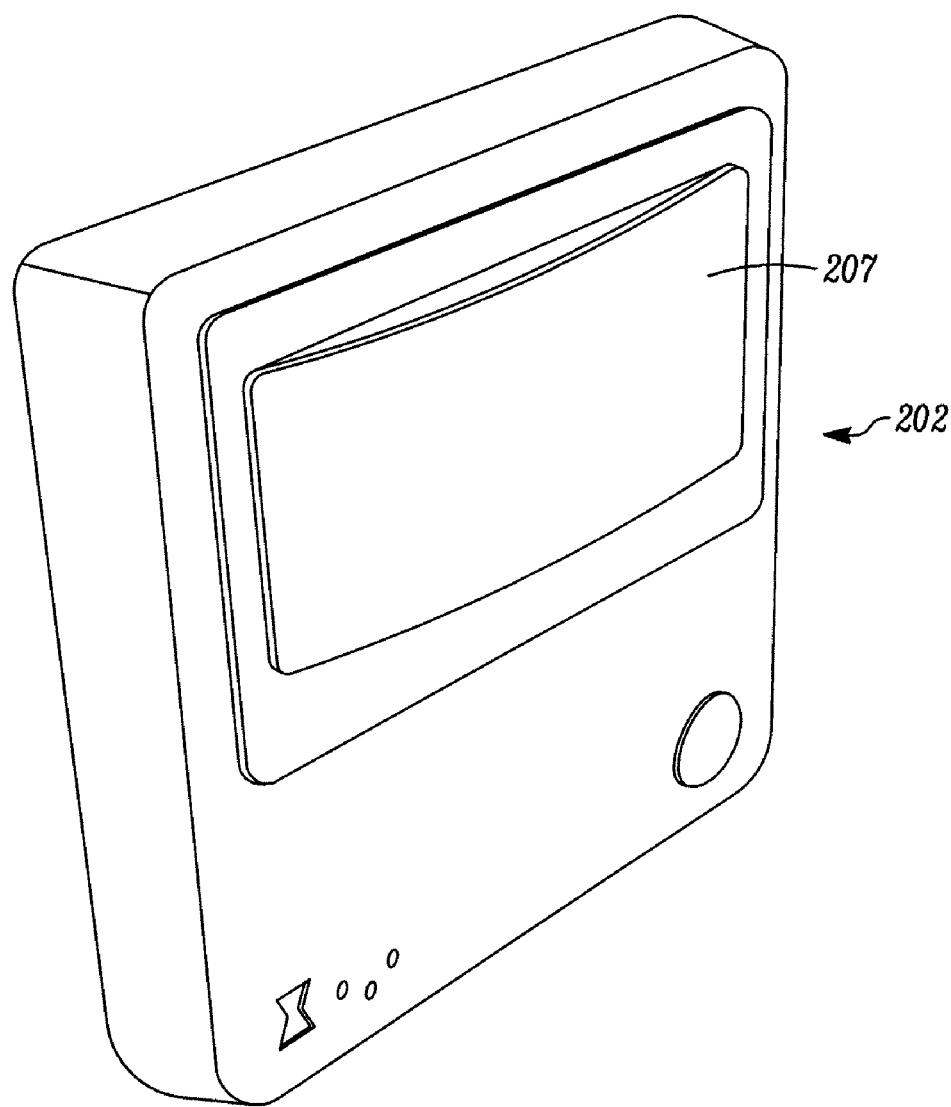
FIG. 2C illustrates a passive infrared activated controller.

FIG. 2B-2C illustrates other controllers that may be used in the network. FIG. 2B illustrates a handheld controller 203. The handheld controller 203 may be placed in a base 204. The base 204 may be used for charging the controller 203 and also for containing a server processor, as described in more detail below. The base 204 may include a power cord 205 for supplying power to the base 204. The handheld controller 203 may include controller buttons 213, 214, and 215 for activating different functions. For example, types of buttons may include on/off/enter buttons 213, scene control buttons 214, and an all-on/all-off panic button 215. Pressing and releasing the on button causes an on signal to be sent to the slave device 101 and pressing and releasing the off button causes an off signal to be sent to the slave device 101. Pressing and holding the on button causes a dim up signal to be sent to the slave device 101 and pressing and holding the off button causes a dim down signal to be sent to the slave device 101. Different functions may be programmed for any of the buttons 213, 214, and 215 however. The handheld controller 203 may also include indicators 206, such as light emitting diodes (LED's).

FIG. 2C illustrates a passive infrared (PIR) controller 202. The PIR controller 202 sends a control signal to a slave device 101 upon detection of presence of body heat from a person. The PIR controller 202 includes a lens 207 for cover a PIR sensor. Other examples of controllers 105 include wall-mounted controllers, such as a wall mounted controller similarly configured to the hand held controller 203, and a key fob controller.

Figure 2D:
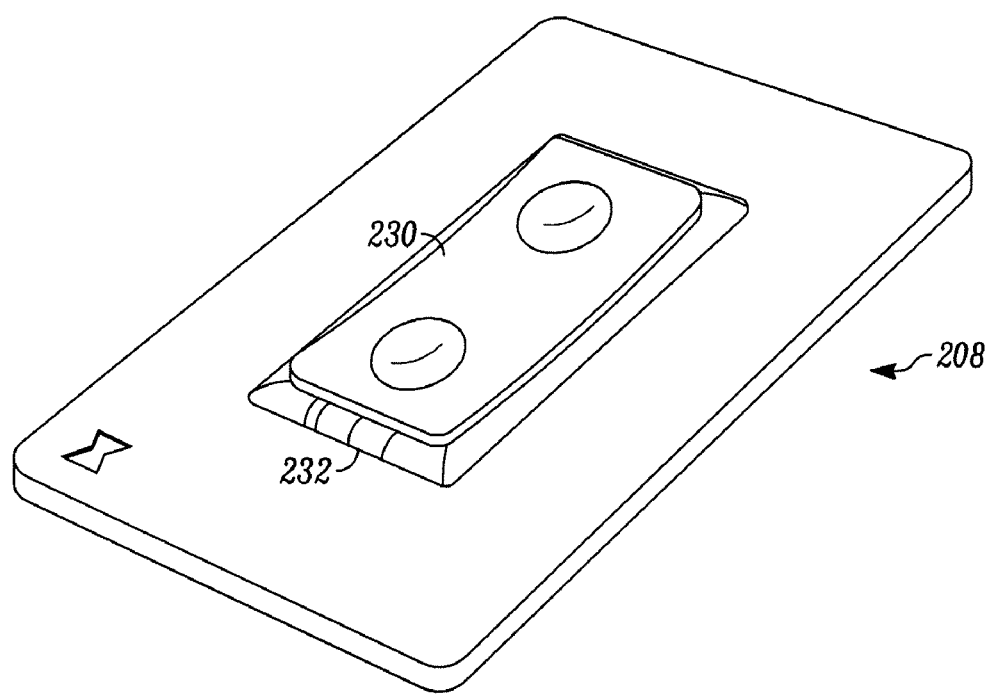
FIG. 2D illustrates a switch with an up/down/dimmer function.
Figure 2E:
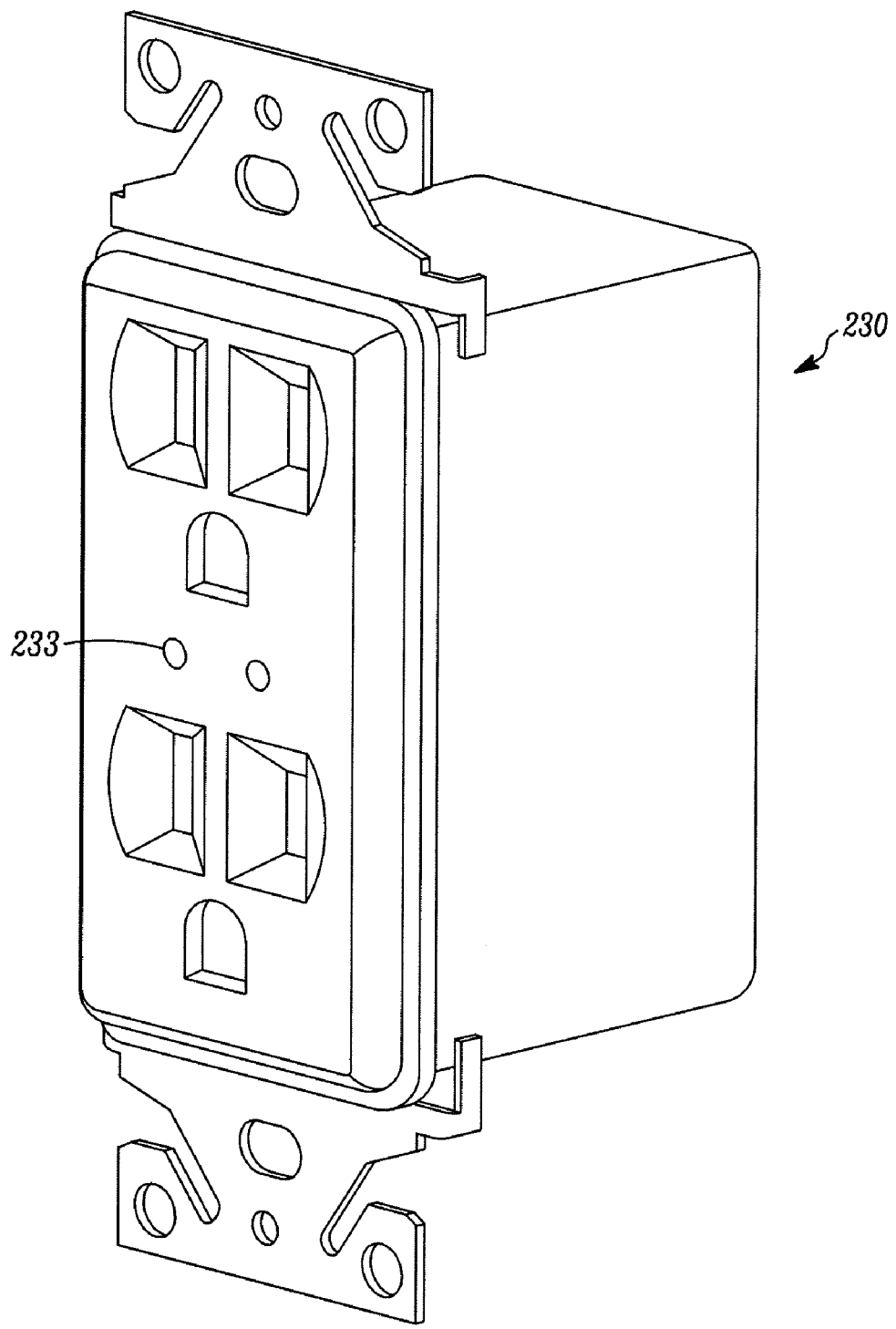
FIG. 2E illustrates a receptacle device.

FIGS. 2D-2E illustrate slave device 101 that may be controlled by the controllers 105, 201 and 203, or other controllers. FIG. 2D illustrates a wall dimmer switch 208. The wall dimmer switch 208 may receive commands from the controllers 101, 201, 203 to turn loads, such as lights, on or off, and/or to dim the loads up or down. To achieve such changes in the loads, the commands may cause the wall dimmer switch 208 to change the state of a relay or semiconductor device, such as a triac, positioned in the wall dimmer switch 208. The wall dimmer switch 208 may include a toggle switch 230 that may be pressed by a user to turn loads on and off, and/or dim the loads up and down without having to use the controller 105, 201, 203 or other controllers. The wall dimmer switch 208 may also include a gap switch 230 that, when set in an open position, physically decouples a flow of current from a power source to the wall dimmer switch 208.

FIG. 2E illustrates an example of a receptacle device 230. The receptacle device 230 may be inserted into a wall as a power outlet to control power to loads or electrical appliances that are plugged into the receptacle device 230. The receptacle device 230 may include a switch, such as a relay or triac, to control power to a load or appliance that is plugged in to the receptacle device 230. The receptacle device 230 may include indictors 233, such as LED's. Other slave devices 101 may also be used such as a wall receptacle converter that may be plugged into a standard receptacle and include a receptacle for a power cord of the device or appliance to plug into. Other slave devices 101 include an outdoor module that has a housing to protect the module from the elements. The outdoor module may include a relay type plug and a prong receptacle to control the on and off switching of loads for outdoor devices. Other slave modules 101 include a lamp socket module with a mechanical relay-type screw-in module utilizing RF signals to communicate commands from a controller 105, 201, 203 to control the on and off switching of loads for incandescent lamps and an outdoor flood lamp module.

Slave devices 101 may interface with the network using different protocols. Some slave devices 101 may run a first protocol, while other slave devices may run protocols other than the first protocol. The home appliance network of the application may allow slave devices 101 that operate different protocols to work with the network.

Referring again to FIG. 1, the network may also include a number of servers, such as a status server 115 and a scene server 120, which are connected to the network. The status server 115 and the scene server 120 may store different databases of information concerning different aspects of the slave devices 101 and controllers 105, as well as information concerning operational states of the devices. The operational states of the slave devices may be known as "scenes," where a scene may be a combination of operational states of the slave devices 101. The slave devices 101 control appliances, which may be in an on/off state, or varying along some scale of actuation or operation, depending on the type of appliance controlled by its associated slave device. The status server 115 and the scene server 120 may be implemented as separate processors or servers, in distinct housings, or together in the same housing. The status server 115 and the scene server 120 may be implemented at one or more locations within the network, such as in the base 204 of the handheld controller 203.

The status server 115 may store in one location information about each node, such as controller 105 and slave device 101, in the system. The status server 115 functionality may be transferred between the one or more possible status servers 115, so that there can be a main status server and auxiliary status servers. The controller 105 may also assume the functionality of a status server 115. The status server 115 functionality may be stored as logic in a memory. The logic illustrated in the sequence of FIGS. 3-6 may be encoded in a signal bearing medium, a computer readable medium such as a memory, programmed within a device such as one or more integrated circuits, or processed by a controller or a computer. If the methods are performed by software, the software may reside in a memory resident to or interfaced to the network slave devices 101, servers, a communication interface, or any other type of non-volatile or volatile memory interfaced or resident to the network logic. The memory may include an ordered listing of executable instructions for implementing logical functions. A logical function may be implemented through digital circuitry, through source code, through analog circuitry, or through an analog source such through an analog electrical, audio, or video signal. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine-readable medium," "propagated-signal" medium, and/or "signal-bearing medium" may include any means that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM" (electronic), a Read-Only Memory "ROM" (electronic), an Erasable Programmable Read-Only Memory (EPROM or Flash memory) (electronic), or an optical fiber (optical). A machine-readable medium may also include a tangible medium upon which software is printed, as the software may be electronically stored as an image or in another format (e.g., through an optical scan), then compiled, and/or interpreted or otherwise processed. The processed medium may be stored in a computer and/or machine memory.

Status servers 115 are connected to the network and in communication with slave devices 101 and controllers 105. Status servers 115 may be located in the network between slave devices 101 and controllers 105, such that the slave device 101 communicates first with a status server 115 before the status server 115 communicates with a controller 105. Devices that use the first protocol may report their state whenever that state changes. This makes the status of devices available whether or not they are listening to the network. Devices that do not communicate with the first protocol may be polled periodically by the Status Server 115. The status server 115 may be configured to not store any scene status information.

The scene server 120 may centralize the control of the scenes for a system. The scene server 120 includes a database of scene settings for a home environment. As described above, scenes include the operational states of the slave devices 101 in the network controlling electrical and electronic appliances associated with the slave devices. A user can change the state of the slave devices 101 so that the appliances combine together to change the settings of a room environment. Such setting might include the lighting state of a room, temperature state, sound ambience, humidity, scent, or other possible environmental characteristics. The scene server 120 may allow easy access to change the scenes with one or more buttons on a controller 105. For example, pushing a button on a controller may cause lights in a hallway leading from a bedroom to a kitchen to turn on, lights in a kitchen to dim up, a coffee machine to turn on, and night lights to turn off.

A controller 105 may include a user interface unit 107 for a user to easily modify the scenes. The user interface unit 107 may include a graphical user interface or a personal computer (PC). The scene server 120 also may allow non-controllers to control scenes if non-controllers are present in the network. Such non-controllers might be routing slaves 101a, where the routing slave device 101a maintains a list of routing instructions for the devices in the network and where the routing slave device 101a sends one or more commands and one or more reports without receiving a command from a controller 105. An example of a routing slave 101a is the PIR module 202, described above. The scene server 120 functions can be transferred to other devices in the network. This may allow an upgrade to the scene server 120 functionality for the entire network by adding a new device 101 with an updated version of the scene server firmware. A scene server 120 may have a scene server firmware level which is compared to the device firmware level of the slave device 101 when the slave device 101 is added to the network. If the device firmware level is more recent than the scene server firmware level, the new slave device 101 may become the new scene server 120 and other devices 101 on the network may be notified and updated accordingly.

Likewise, the scene server 120 functions and status server 115 functions may be included in the same device 101 or controller 105. Just as for the status servers 115, scene servers 120 may be connected to the network and in communication with controllers 105 and slave devices 101 that are also connected to the network. Scene servers 120 may be located in the network between slave devices 101 and controllers 105 such that a slave device 101 may communicate with a scene server 120 first before the scene server 120 communicates with a controller 105.

A home automation system may also include battery chargers (see e.g. base 204 in FIG. 2B), which charge up controllers 105 that are associated with a battery charger. The battery charger base 204 may contain communications functionality, firmware, and or software for communication with the network and transferring data to a controller 105. This allows controllers 105 to be movable and not required connection to a wall power unit or extension cord. A controller 105 may be placed in a battery charger base 204 for charging and communicating with the base 204.

When a controller 105 is in a base 204, it may inform the status server 115, so that any scene information may be routed through the base 204. The controller 105, then, does not need to communicate with the status server 115 wirelessly. This may be desirable when battery devices are unavailable for communication unless they communicate to the user where their location. The battery charger 108 can be used to locate controllers 105. When a charger 108 is powered up, it may send a signal to the status server 115 that then signals all controllers 105 not in a base 204 associated with the controller 105 to trigger an audible beep. A new controller 105 may be added to the network by coupling the controller 105 to its associated base 204. It may occur that some controllers 105 are lost, in that they can no longer be located and have not checked in when polled in the network. Any lost controllers 105 may be automatically replaced and their scene information may be copied to the new controller 105.

Figure 3:
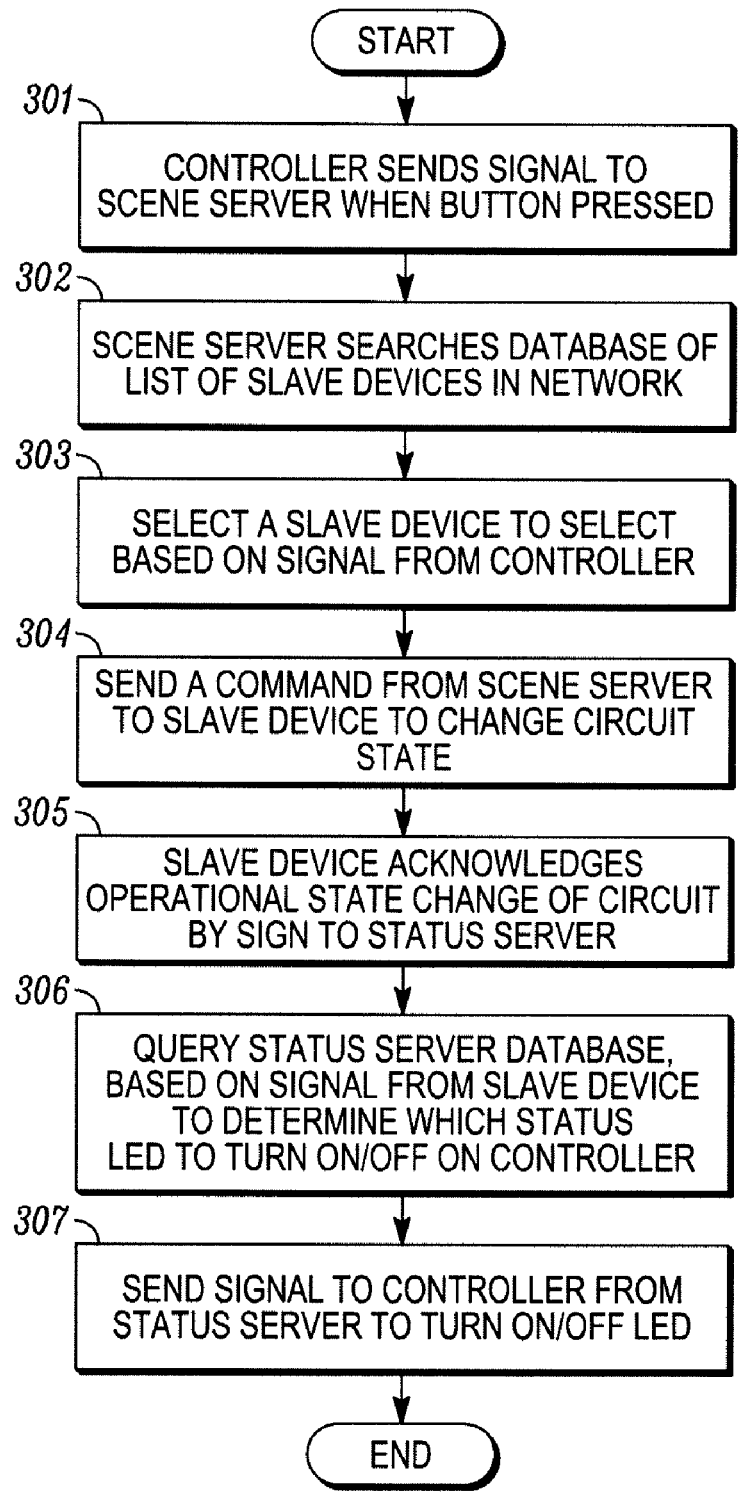
FIG. 3 is a flow chart describing communication with the home automation protocol.

FIG. 3 depicts a method for communicating with slave devices 101 in the home automation network using the home automation network protocol. A user sends a signal 301 from a controller 105, connected to a network of slave devices 101, controllers 105, status servers 115, and scene servers 120, to a scene server 120 when a button on the controller 105 is actuated by the user. This may be done when the user wishes to actuate an appliance circuit 111 associated with a slave device 101. The user may want to turn on a light, for example, though other actions include turning off a light, changing the light level, changing a thermostat setting, actuating a sensor, or interacting with a home PC or entertainment network. The scene server 120 may receive the signal directly from the controller 105 in the network, or the signal may be routed through the network by a routing slave device 101a, other slave devices 101 and/or controllers 105. The scene server 120 may process 302 the signal by searching a database including a list of the one or more slave devices 101 connected to the network. The scene server 120 selects 303 a slave device 101, based on the signal received from the controller 105. Thereafter, the scene server 120 may send 304 a signal to the selected slave device 101 to change the state of the appliance circuit 111 associated with the selected slave device 101.

The slave device 101 acknowledges 305 the signal from the scene server 120, changes its operation state, and sends a signal to a status server 115. The signal may be sent directly to the status server 115 interconnected between the slave device 101 and the controller 105, or the signal may be routed by a routing slave device 102 through the network. The signal may include actual or assumed status of the connected devices 101. For example, the slave device 101 may include circuitry that determines if a load of the device 101 actually changed state, such as a light bulb turning on, or not, or a light bulb missing or burned out. The assumed status may include a relay or triac of the slave device 101 switching, assuming that the load of the controlled device is operating properly.

The status server 115 may query a database contained in the status server 115, where the database may include a list of operational states of the slave devices 101 in the network. The status server 115 queries the database 306 to determine which, if any, status LED 203 on the controller 105 to turn on or turn off. The status LED's 203 on the controller 105 may indicate the state of the slave device 101, and its associated appliance circuit. Finally, the status server 115 sends a signal 307 to the controller 105 to turn on or turn off the determined LED 203, based on the results of the database query 306. In this method, the appliance circuit may be a relay, triac, or other semiconductor switching devices that are normally incorporated in home electrical and electronic appliances.

Figure 4:
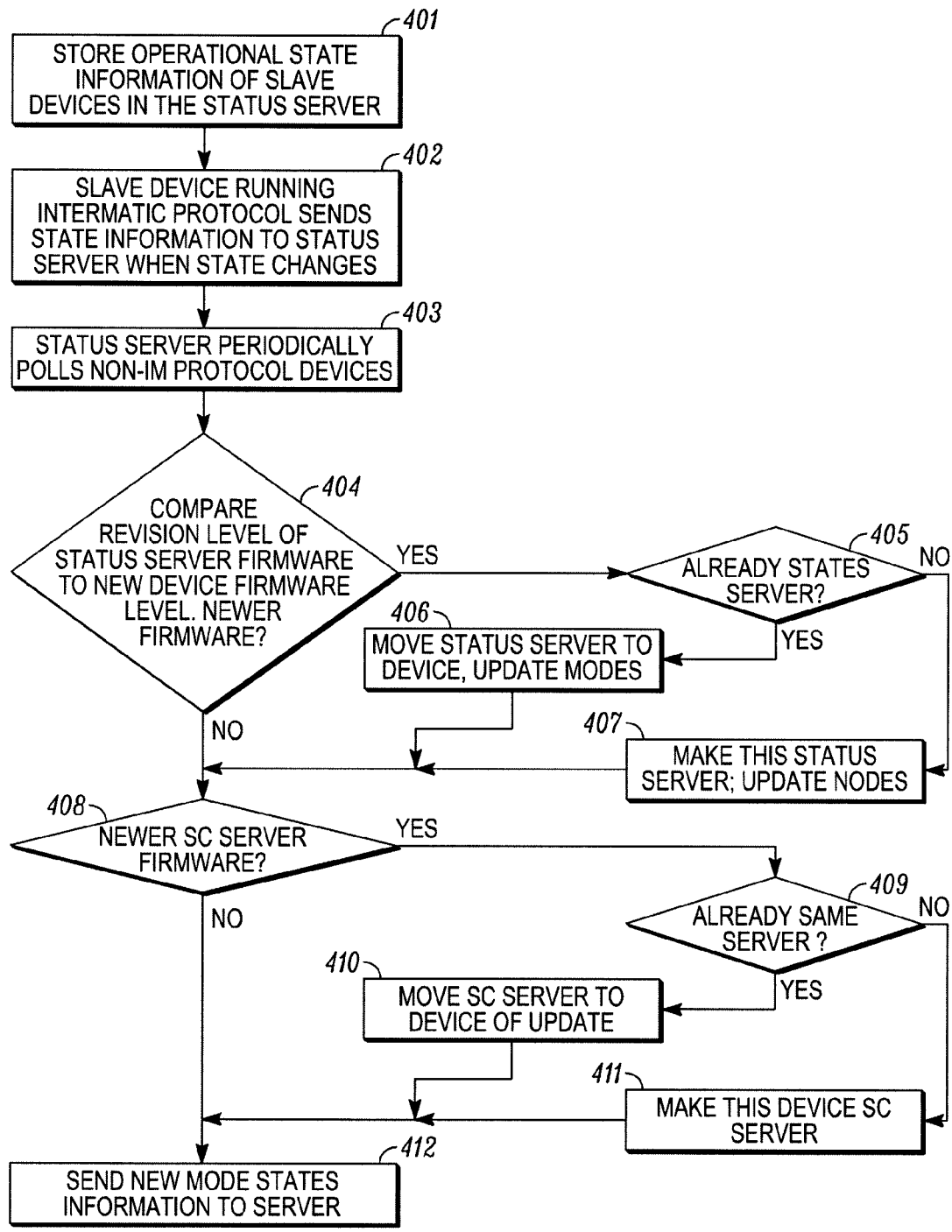
FIG. 4 is a flow chart describing operations of the home automation protocol.

FIG. 4 depicts a method for automating and configuring a home automation network for a home environment. A network including one or more controllers 105 running a first protocol may be provided. The network may also include a number of slave devices 101 running the first protocol, as well as a number of slave devices 101 running other protocols. The network further may also include a number of status servers 115 or scene servers 120 in communication with the network. The status server 115 may have a status server firmware revision level, and the scene server 120 may have a scene server firmware level. The slave devices 101 may allow a number of operational states, as well as a slave device status server firmware level and a slave device scene server firmware level. The home automation network functions by storing, in a status server 115, status information 401 associated with the operational state of a slave device 101. The slave device 101, which may run the first protocol, may send 402 status information indicating the operational state of the slave device 101 and the appliance circuit associated with the slave device 101, to the status server 115 when the operational state of the slave device 101 changes. In order to account for slave devices 101 running a different protocol, the network periodically polls 403 slave devices 101 running a second protocol to determine if the different protocol slave device 101 has changed its operational state.

The network may compare 404 the slave device status server firmware revision level with the status server firmware revision level to determine if a newer version of status server firmware is available. If there is a newer version of status server firmware available, the network may determine 405 if a status server 115 already is present in the network. If there is an existing status server 115, the network may move the status server functions 406 to the slave device 101 that is sending a changed operational state and possessing a newer device status server firmware revision level than the current status server firmware level, and the network may update other slave devices 101 and controllers 105 of this update. If there is not an existing status server 115 in the network, the network may make the updating slave device 101 the new status server 407, and update other nodes, such as slave devices 101, controllers 105, and routing slaves 103, in the network accordingly.

The network compares 408 the slave device scene server firmware version level with the scene server firmware revision level to determine if a newer version of scene server firmware is available. If there is a newer version of scene server firmware available, the network may determine 409 if a scene server 115 is already present in the network. If there is an existing scene server 120, the network may move the scene server functions 410 to the slave device 101 that is sending a changed operational state and possessing a newer device scene server firmware revision level that the current scene server firmware revision level, and the network updates other slave devices 101 and controllers 105 of this update. If there is not an existing scene server 120 in the network, the network designates the updating slave device 101 as the new scene server 411, and update other nodes, such as slave devices 101, controllers 105, and routing slaves 103, in the network accordingly. Finally, the network may send new status server 115 or scene server 120 information to the nodes in the network.

Figure 5:
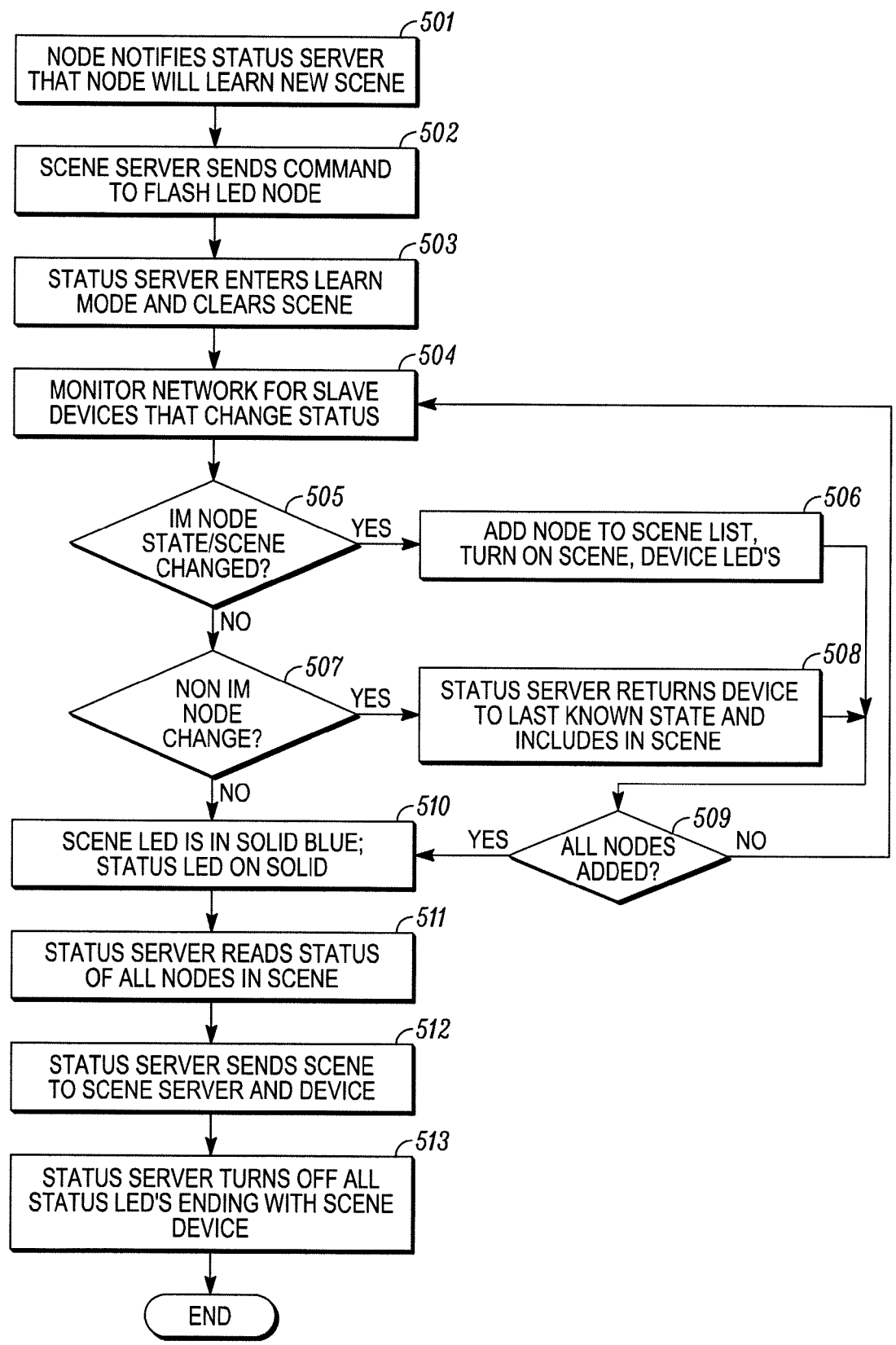
FIG. 5 is a flow chart describing the setting of a new scene in a home automation protocol.

FIG. 5 depicts programming a home environment scene using the home automation network. A network including one or more controllers 105 running a first protocol is provided. The network may also include a number of slave devices 101 running the first protocol, as well as a number of slave devices 101 running a different protocol. The network further may include a number of status servers 115 or scene servers 120 in communication with the network. The status server 115 may have a status server firmware revision level, and the scene server 120 may have a scene server firmware revision level. The slave devices 101 may allow a number of operational states, as well as a slave device status server firmware revision level and a slave device scene server firmware revision level. The slave device 101 that initiates the scene information change may be considered to be the scene device 112. The scene device 112 notifies 501 the status server 115 that the scene device 112 is going to learn a new scene definition including some combination of operational states of the slave devices 101 in the network. The network, through a status server 115 causes the slave devices 101 running a first protocol to flash 502 one or more indicator LED's 203 on the slave devices 101. The status server 115 is changed 503 to a learn mode to indicate that the status server 115 is prepared to learn a new scene. The network is monitored 504 for slave devices 101 that change operational states. If a scene device 112 running the first protocol is changed 505, this slave device 101 is added to a scene list 506 which may include the slave devices 101 interacting in the scene information. In addition, scene and device LED's 203 are actuated on the slave device 101.

If the network determines 508 that the slave device 101 running a second, different protocol is the scene device 112, the status server 115 returns this device to its last known state 508 and includes the second protocol scene device 112 in the scene list which includes the slave devices 101 interacting in the scene information. Non-first protocol devices are added by changing the state of the device 101. Because the non-first protocol devices 101 are polled periodically, the user cannot be sure that they have been properly added to the scene. To correct this, the user changes the setting on the device 101. The next time that device 101 is polled, the status server 115 may signal that it has read the state change by using the device's state. One option is to return the device 101 to its previous level. This indicates to the user that the non-first protocol device 101 has been added. The user can then change it to its final setting. For example, a user may like to have their blinds open to 50% in a scene and they are currently closed. The user opens the blinds all the way and continues to set up their scene. When the status server 115 notices the blinds are open, it closes them to let the user know that they are a part of the scene. The user sets the blinds to 50%. The status server 115 allows the non-first protocol slave device 101 to return to its previous changed state.

After checking all the nodes to be included in the scene 509, the network actuates the scene LED 203 to turn on 510, such as to turn on to solid blue. The status LED 203 is on solid as well. The status server 115 reads the status of all nodes in the scene 511. The status server 115 may send the scene information 512 to the scene server 120 and the slave devices 101. Finally, the status server 115 turns off all status LED's 512 of the slave devices 101 in the scene, ending with the scene device 112.

Figure 6:
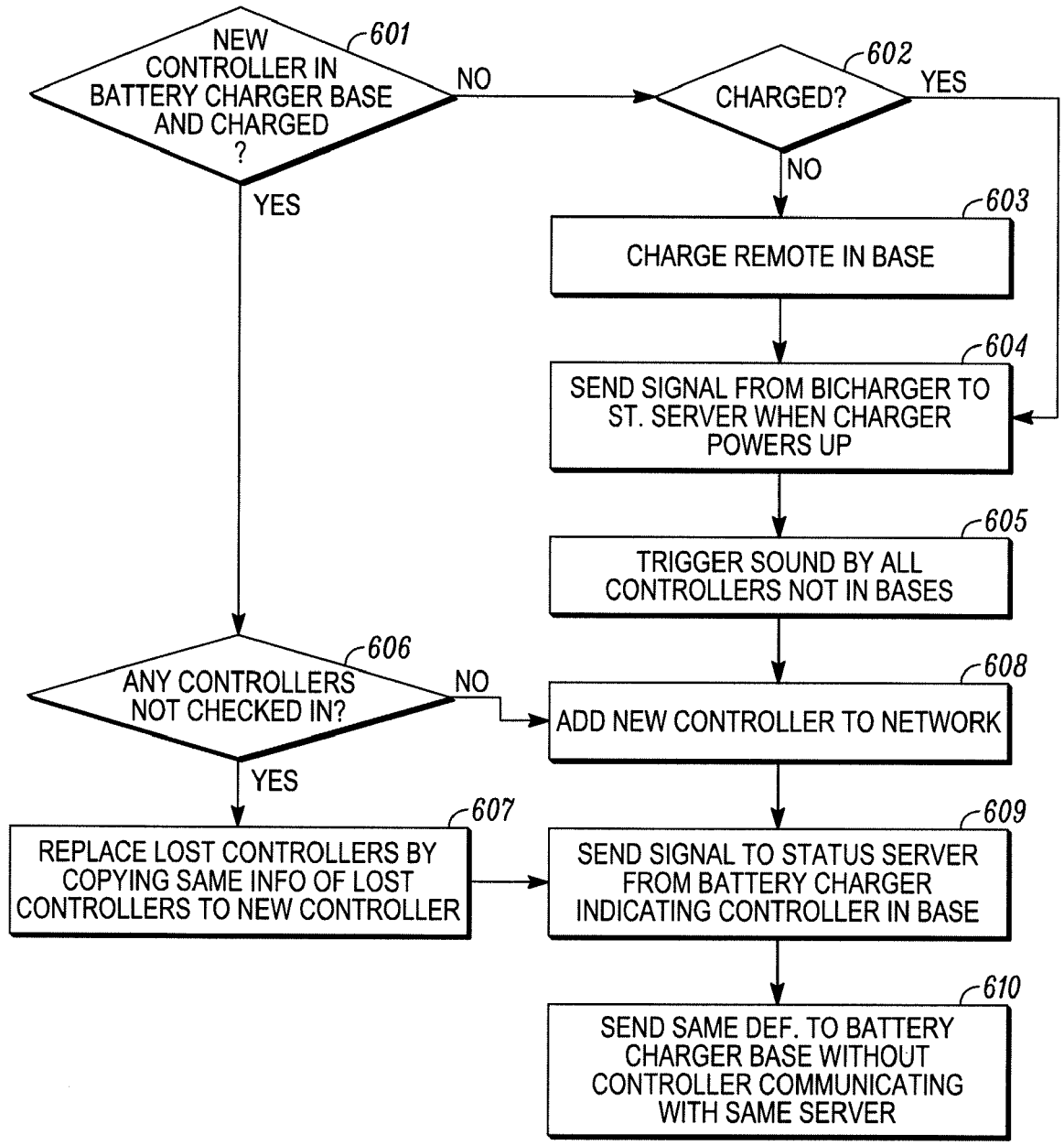
FIG. 6 is a flow chart describing operation of the network with battery chargers.

FIG. 6 depicts a method when battery chargers 108 are included in the network, so that the home automation network may communicate to the controllers 105 associated with the battery charger 108 and battery charger base 204, and add new controllers 105. The network determines 601 if the new controller 105 that is sending a signal to the network is in its base 204 and charged fully. Controllers 105 may contain a rechargeable battery such as a NiCD, Li-ion cell or other rechargeable cell, so that the controller 105 can be remotely used without the need for connection to a wall unit for power. If the controller 105 is in its base 204 and charged 602, the network adds 608 the new controller 105 to the network. If the controller 105 is in its base but not charged 603, the base 204 may charge the controller 105 until the controller 105 is fully charged. The controller 105 sends a signal to the status server 115 indicating that the controller 105 is fully charged 604. The network may trigger 605 all controllers 105 not in their associated bases 204, and/or all controllers 105 to emit an audible beep. The network may add 608 the new controller 105 to the network.

If initially the new controller 105 is not in its base 204 but is fully charged, the network checks 606 to determine if any controllers 105 in the network have not responded to a network query of all controllers 105. The network may perform this by sending a query signal to a known list of controllers 105 from the last time the network either added a new controller 105 or started up. If the network determines 606 that there are no lost controllers 105, that is, controllers 105 that have not responded to the query signal, the network adds the new controller 105 to the network 608. If the network determines that there are lost controllers 105, the network may replace the lost controller 105 with the new controller 105 by copying the scene information contained in the lost controller 105 to the new controller 105.

After the new controller 105 is either added to the network 608 or lost controllers 105 are replaced 607 by the new controller 105, such as via the battery charger 108, the charger 108 sends a signal to the status server 115 indicating that the controller 105 is in its base 204 and ready for operation 609. The network and slave devices 101 in the network may send scene definitions to the battery charger base 204 without communicating directly 610 with the controller 105. This makes it so that the controller 105 does not need to check in with the status server 115, which may be desired because battery devices cannot be communicated with unless they tell you where they are.

The network as described can be implemented with any standard networking technology available for use in the home. Examples of such network interface include, but are not limited to Ethernet, coaxial cable, power cable transmission, wireless interfaces like WiFi, Bluetooth, IRDA, or other wireless interface technologies.

While various embodiments of the invention have been described, it may be apparent to those of ordinary skill in the art that many more embodiments and implementations are possible within the scope of the invention. Accordingly, the invention is not to be restricted except in light of the attached claims and their equivalents.

We claim:

1. A home automation system for controlling appliances comprising:

at least one controller having at least one indicator, where the controller is in communication with a network;

at least one slave device in communication with the network, where the slave device has a one or more operational states;

at least one status server, where the status server maintains a database comprising a list of the slave devices and a list of slave device states, and where the status server is in communication in the network with the controller and the slave device; and at least one scene server separate from the status server, where the scene server maintains a database of scene information comprising a one or more room settings parameters for the controllers, and where the scene server is connected in communication in the network with the controller and the slave device, where the network is configured to route a plurality of commands between the controller, the scene server, the status server, and the slave devices, where one of the at least one status server comprises a main status server.

2. The system of claim 1 where the plurality of commands further comprises a first command from the controller to the scene server regarding an input that was switched, which causes a second command to be sent from the scene server to the slave device to control the operational state of the slave device.

3. The system of claim 2 where the plurality of commands further comprises a third command regarding status of the slave device sent from the slave device to the status server, which causes a fourth command to be sent from the status sever to the controller to control a state of the indicator.

4. The system of claim 3, where the status server periodically polls slave devices having protocols different from the protocol of the status server.

5. The system of claim 1, where the slave device communicates by at least one interface protocol.

6. The system of claim 5 where the status server changes a state of the polled slave device from a first state to a second state to indicate the slave device is added to a scene.

7. The system of claim 1 further comprising at least one base unit, where the base unit is associated with a controller.

8. The system of claim 7 where the base unit is used to locate controllers.

9. The system of claim 1 where the controller comprises a display screen for displaying room settings parameters.

10. The system of claim 1 where the scene server and status server are contained in a single device.

11. The system of claim 1 where the status server does not show any scene status.

12. The system of claim 1 where the scene server is implemented in a controller.

13. The system of claim 1 where the controller maintains a master routing table comprising a list of routing instructions for the slave devices and controllers in the network.

14. The system of claim 1 where the slave device comprises a routing slave device, where the routing slave device maintains a list of routing instructions for the slave devices and controllers in the network and where the routing slave device sends the a command without receiving a command from a controller.

15. A method for setting a home environment scene comprising:

providing a network comprising at least one controller running a first protocol, at least one slave device running a first or second protocol, at least one status server, where one of the at least one status server comprises a main status server, and at least one scene server, where the status server and scene server are located in the network with the controller and the slave device, and where the slave device controls an appliance, and where the slave device has an operational states;

notifying the main status server by a slave device that the slave device is going to learn a scene definition comprising the operational state of the slave devices;

flashing a one or more indicator on the slave devices running the first protocol;

changing the main status server to a learn mode state;

monitoring the network for slave devices that change operational state while the main status server is in the learn mode state;

signaling by the main status server that the scene definition has been set;

changing the flashing indicator;

reading the operational state of the slave device which are in the scene definition;

sending the scene information by the main status server to the scene server and the slave device; and turning off the indicator on the slave device.

16. The method of claim 15 where the adding the slave devices running the second protocol comprises:

changing a setting of the slave device running the second protocol by the user from a first state to a second state; and adding the state of the slave device running the second protocol to the status server when the status server polls the slave device.

17. The method of claim 16 further comprising changing the state of the slave device running the second protocol from the second state to the first state.

18. The method of claim 16 where the adding a new controller comprises:

placing the new controller in an associated base;

establishing if any controllers that were previously in communication with the network are no longer in communication with the network;

replacing any controllers that are no longer in communication with the network; and copying a scene information from the controllers that are no longer in communication with the network to the new controller.

* * * * *